United States Patent
Wang et al.

(10) Patent No.: US 12,107,528 B2
(45) Date of Patent: Oct. 1, 2024

(54) MOTOR CONTROLLER HAVING LOW NOISE HIGH FREQUENCY SIGNAL INJECTION

(71) Applicant: Allegro MicroSystems, LLC, Manchester, NH (US)

(72) Inventors: Lu Wang, Edinburgh (GB); Masahira Kurihara, Edinburgh (GB); Kamyar Khosravi, Austin, TX (US); Andrea Foletto, Andorno Micca (IT)

(73) Assignee: Allegro MicroSystems, LLC, Manchester, NH (US)

( * ) Notice: Subject to any disclaimer, the term of this patent is extended or adjusted under 35 U.S.C. 154(b) by 138 days.

(21) Appl. No.: 18/060,670

(22) Filed: Dec. 1, 2022

(65) Prior Publication Data

US 2024/0186921 A1    Jun. 6, 2024

(51) Int. Cl.
*H02P 6/18*    (2016.01)

(52) U.S. Cl.
CPC .................. *H02P 6/183* (2013.01)

(58) Field of Classification Search
CPC .... H02P 6/183; H02P 6/04; H02P 6/06; H02P 6/08; H02P 6/10; H02P 6/16; H02P 6/28; H02P 6/32; H02P 7/00; H02P 7/245; H02P 7/29; H02P 21/00; H02P 21/18; H02P 21/22; H02P 21/24; H02P 23/07; H02P 23/14; H02P 21/10; H02P 21/30; H02P 25/03; H02P 25/062; H02P 27/06; H02P 27/08; H02P 29/50; H02P 27/063; H02P 21/26; H02P 21/14; H02P 2203/09; H02P 2207/01; H02K 17/30
See application file for complete search history.

(56) References Cited

U.S. PATENT DOCUMENTS

| | | |
|---|---|---|
| 5,708,578 A | 1/1998 | Stoddard et al. |
| 8,138,708 B2 | 3/2012 | Ward et al. |
| 8,629,642 B2 | 1/2014 | Ward et al. |
| 9,172,320 B2 | 10/2015 | Reynolds et al. |
| 9,281,769 B2 | 3/2016 | Reynolds et al. |
| 9,843,285 B1 | 12/2017 | Lu |

(Continued)

FOREIGN PATENT DOCUMENTS

| | | |
|---|---|---|
| CN | 106357102 A | 1/2017 |
| JP | 2010-035353 A | 2/2010 |

OTHER PUBLICATIONS

Zhang et al., "Pseudorandom-Frequency Sinusoidal Injection for Position Sensorless IPMSM Drives Considering Sample and Hold Effect;" Proceedings of IEEE Transactions on Power Electronics, vol. 34, No. 10; Oct. 2019; 13 Pages.

(Continued)

*Primary Examiner* — Antony M Paul
(74) *Attorney, Agent, or Firm* — DALY, CROWLEY, MOFFORD & DURKEE, LLP

(57) ABSTRACT

Methods and apparatus for motor control having low noise variable-high frequency signal injection for an electric motor. Different injection signals have different signal characteristics. One of the first and second injection signals is selected on a cycle-by-cycle basis as part of a direct voltage signal input to control an electric motor. The first and second signal characteristics are configured to reduce acoustic noise generated by an electric motor.

23 Claims, 6 Drawing Sheets

(56) References Cited

U.S. PATENT DOCUMENTS

| | | |
|---|---|---|
| 10,116,243 B2 | 10/2018 | Lu et al. |
| 10,181,810 B2 | 1/2019 | Lu et al. |
| 10,312,847 B2 | 6/2019 | Lu |
| 10,326,389 B2 | 6/2019 | Lu et al. |
| 10,348,223 B1 | 7/2019 | Khosravi et al. |
| 10,651,767 B2 | 5/2020 | Lu et al. |
| 10,784,810 B1 | 9/2020 | Lu |
| 10,819,257 B1 | 10/2020 | Khosravi et al. |
| 10,873,280 B2 | 12/2020 | Lu et al. |
| 11,387,756 B1 | 7/2022 | Khosravi et al. |
| 2004/0070360 A1* | 4/2004 | E. Schulz ............... H02P 6/183 318/700 |
| 2018/0367073 A1 | 12/2018 | Haas |
| 2020/0295682 A1 | 9/2020 | Lu |
| 2021/0091692 A1 | 3/2021 | Lu |

OTHER PUBLICATIONS

Feng et al., "A Random-Based High-Frequency Square Wave Injection Sensorless Control System with Reduced Acoustic Noise and Electromagnetic Interference;" Proceedings from the 2019 IEEE 3$^{rd}$ Advanced Information Management, Communicates, Electronic and Automation Control Conference (IMCEC 2019); Oct. 11, 2019; 5 Pages.

Hu et al., "A Random High-Frequency Voltage Injection Sensorless Control Strategy Based on Chaotic Mapping for PMSM Drives;" Proceedings from the 2022 25$^{th}$ International Conference on Electrical Machines and Systems (ICEMS); Nov. 29, 2022; 6 Pages.

Wang et al., "Position Sensorless Permanent Magnet Synchronous Machine Drives—A Review;" Proceedings of the IEEE Transactions on Industrial Electronics, vol. 67, No. 7; Jul. 2020; 13 Pages.

Wang et al., "A Robust DPCC for IPMSM Based on a Full Parameter Identification Method;" Proceedings of the IEEE Transactions on Industrial Electronics, vol. 70, No. 8; Aug. 2023; 11 Pages.

Zhang et al., "Pseudo-Random High-Frequency Sinusoidal Voltage Injection Based Sensorless Control for IPMSM Drives;" Proceedings of the 2018 International Power Electronics Conference; May 20, 2018; 6 Pages.

PCT International Search Report and Written Opinion dated Oct. 18, 2023 for International Application No. PCT/US2023/071076; 15 Pages.

* cited by examiner

MOTOR CONTROLLER HAVING LOW NOISE HIGH FREQUENCY SIGNAL INJECTION

BACKGROUND

As is known in the art, motor controller integrated circuits can be used to control and drive brushless DC (BLDC) electric motors. Conventional control systems for interior permanent magnet synchronous machines (IPMs) typically supply a sinusoidal voltage to the motor. Known techniques for high frequency injection (HFI) in zero/low speed ranges tends to cause harsh acoustic noise. It is desirable to reduce amount of noise generated by one or more motors to acceptable decibel levels.

SUMMARY

Embodiments of the disclosure provide methods and apparatus for a motor controller having low noise variable high frequency injection (LN-HFI) for an electric motor. In some embodiments, a digital-based fixed-point random signal generation (FRSG) scheme is used to select one of multiple motor injection signals. In some embodiments, a motor control system includes a direct voltage control (DVC) mode.

In one aspect, a method comprises: receiving a first injection signal having first signal characteristics; receiving a second injection signal having second signal characteristics that are different than the first signal characteristics; selecting a first one of the first and second signals for combining with a direct voltage signal to provide an input to a first transform, wherein the first and second signal characteristics are configured to reduce acoustic noise generated by an electric motor, wherein the direct voltage signal is defined in a (d,q) coordinate system with orthogonal components along d (direct) and q (quadrature) axes such that a field flux linkage component of motor current is aligned along the d axis and a torque component of current is aligned along the q axis; and converting an output of the first transform to signals for driving the electric motor.

A method can further include one or more of the following features: high pass filtering a current from the motor, a second transform on the current from the motor after the high pass filtering, extracting envelope information of high frequency current signal output from the second transform, determining a position error from the extracted envelope information, the position error is a difference between an injection estimation angle and a real angle for the motor, obtaining an estimation angle for the motor, a random signal generator for selecting the first one of the selecting a first one of the first and second signals, the first signal characteristics including varying amplitude and frequency, the first and second signals are injected randomly into the first transform, and/or direct voltage control to provide a quadrature voltage Vq to the first transform.

In another aspect, a motor controller comprises: a signal generator to generate a first injection signal having first signal characteristics and a second injection signal having second signal characteristics that are different than the first signal characteristics; an injection controller to select a first one of the first and second signals for combining with a direct voltage signal to provide an input to a first transform, wherein the first and second signal characteristics are configured to reduce acoustic noise generated by an electric motor, wherein the direct voltage signal is defined in a (d,q) coordinate system with orthogonal components along d (direct) and q (quadrature) axes such that a field flux linkage component of motor current is aligned along the d axis and a torque component of current is aligned along the q axis; and a circuit module to converting an output of the first transform to signals for driving the electric motor.

A motor controller can further include one or more of the following features: high pass filtering a current from the motor, a second transform on the current from the motor after the high pass filtering, extracting envelope information of high frequency current signal output from the second transform, determining a position error from the extracted envelope information, the position error is a difference between an injection estimation angle and a real angle for the motor, obtaining an estimation angle for the motor, a random signal generator for selecting the first one of the selecting a first one of the first and second signals, the first signal characteristics including varying amplitude and frequency, the first and second signals are injected randomly into the first transform, and/or direct voltage control to provide a quadrature voltage Vq to the first transform.

In a further aspect, a motor controller comprises: a signal generator means for generating a first injection signal having first signal characteristics and a second injection signal having second signal characteristics that are different than the first signal characteristics; an injection controller means for selecting a first one of the first and second signals for combining with a direct voltage signal to provide an input to a first transform, wherein the first and second signal characteristics are configured to reduce acoustic noise generated by an electric motor, wherein the direct voltage signal is defined in a (d,q) coordinate system with orthogonal components along d (direct) and q (quadrature) axes such that a field flux linkage component of motor current is aligned along the d axis and a torque component of current is aligned along the q axis; and a circuit module to converting an output of the first transform to signals for driving the electric motor.

BRIEF DESCRIPTION OF THE DRAWINGS

The foregoing features of this disclosure, as well as the invention as claimed, may be more fully understood from the following description of the drawings in which:

DETAILED DESCRIPTION

Prior to describing example embodiments of the disclosure, some information is provided. Field-oriented control (FOC) is a known variable frequency drive technique in which stator currents of a three-phase brushless DC motor are represented as a vector having two orthogonal components corresponding to magnetic flux of the motor and motor torque. Current component references from the flux and torque references given by the speed control can be computed. Proportional-integral (PI) controllers are often used to maintain current components at reference values. PWM (pulse wave modulation) of the variable frequency drive control switching of transistors driving the motor phases according to the stator voltage references that are the output of the PI current controllers.

Figure 1:
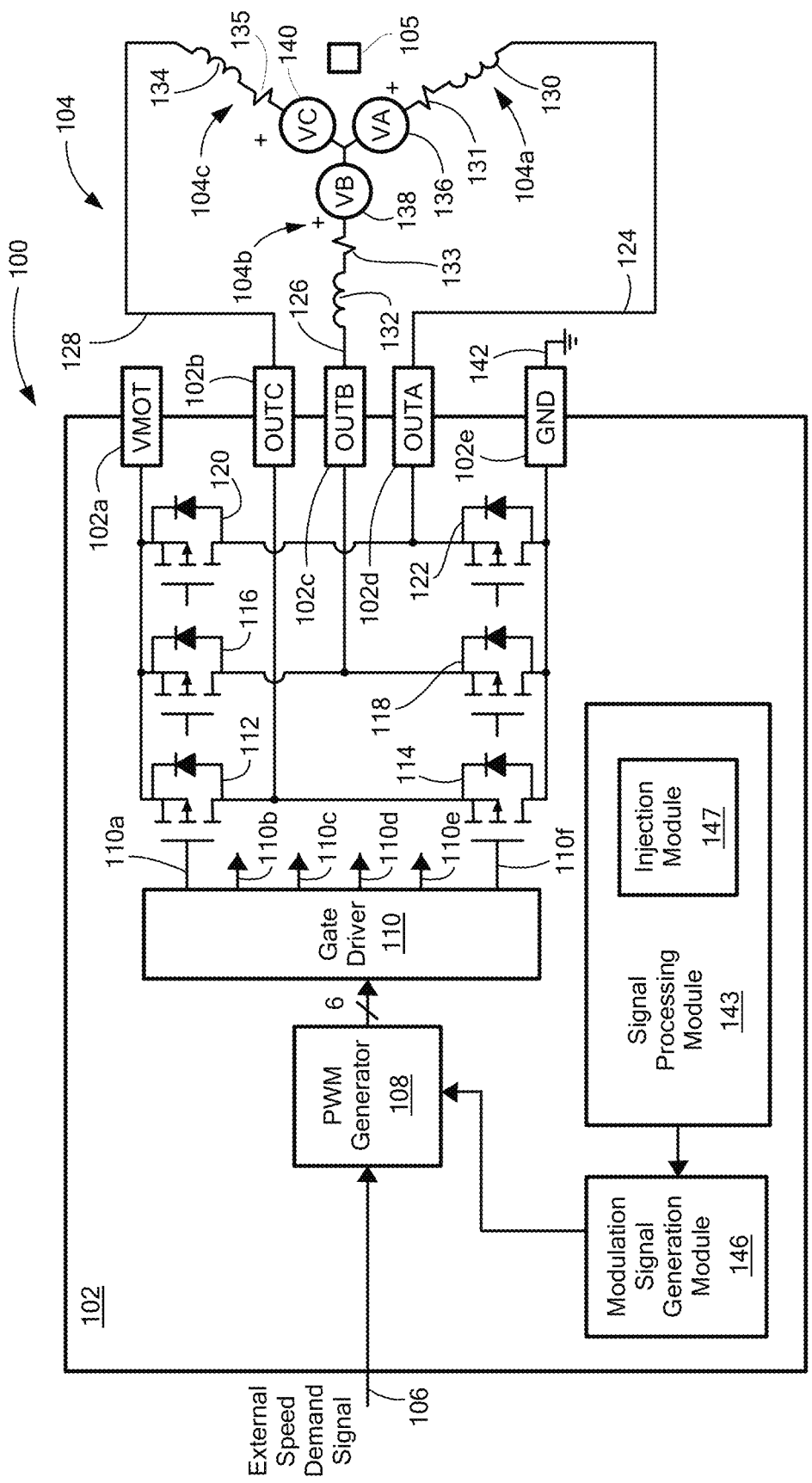
FIG. 1 shows an example motor control circuit coupled to an electric motor for providing LN-HFI for an electric motor in accordance with example embodiments of the disclosure.
Figure 1A:
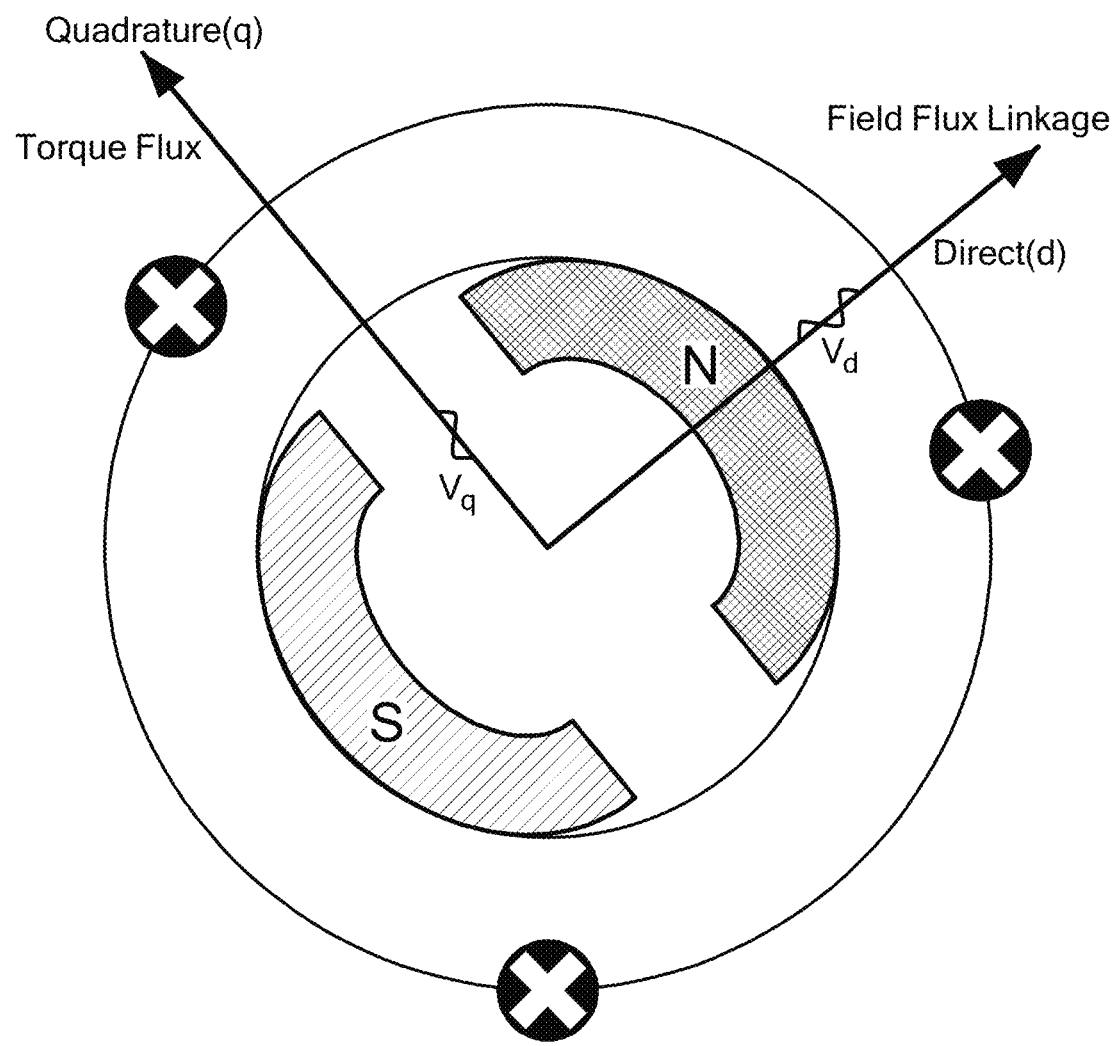
FIG. 1A shows an example (d,q) coordinate sytem with orthogonal components along d (direct) and q (quadrature) axes such that a field flux linkage component of current is aligned along the d axis and torque component of current is aligned along the q axis.

Vector control generates a three-phase PWM motor voltage output derived from a voltage vector to control a current vector derived from motor three-phase stator current input through rotations back and forth between the three-phase speed and time dependent system and the vector rotating reference-frame two-coordinate time invariant system, which is defined in a (d,q) coordinate system with orthogonal components along d (direct) and q (quadrature) axes such that a field flux linkage component of current is aligned along the d axis and torque component of current is aligned along the q axis (see FIG. 1A). The induction motor (d, q) coordinate system can be superimposed to the instantaneous (a,b,c) three-phase sinusoidal system.

Well-known inverse and non-inverse Park and Clarke transforms can convert between a system three phase currents and voltages and a two-coordinate linear time-invariant system. These transforms facilitate the use of PID controllers to maintain reference values.

FIG. 1 shows an example motor control circuit 102 coupled to an electric motor 104 for providing LN-HFI in accordance with example embodiments of the disclosure. In embodiments, the motor control circuit 102 is sensorless.

It should be noted that the term sensorless control, without specifying the type of magnetic sensor, implies the absence of a speed sensor and position sensor for the motor. Example compensator embodiments can be used in systems with and without a speed sensor, or in other words: speed control systems and sensorless speed control systems.

The motor 104 is shown to include three windings 104a, 104b, 104c, which can be depicted as a respective equivalent circuit having an inductor in series with a resistor and in series with a back EMF (BEMF) voltage source. For example, the winding A 104a is shown to include an inductor 130 in series with a resistor 131 and in series with a back EMF voltage source VA 136.

The motor control circuit 102 includes an external voltage demand signal 106 from outside of the motor control circuit 102. The external voltage demand signal 106 can be in one of a variety of formats. In general, the external voltage demand signal 106 is indicative of a speed and load condition of the motor 104 that is requested from outside of the motor control circuit 102.

A pulse width modulation (PWM) generator 108 is configured to generate PWM signals having a duty cycle and pattern that is controlled by a modulation signal generation module 146. The PWM signals are generated by a PWM generator 108 with a modulation characteristic (i.e., a relative time-varying duty cycle) in accordance with the modulation waveforms.

The motor control circuit 102 also includes a gate driver circuit 110 coupled to receive the PWM signals and configured to generate PWM gate drive signals 110a, 110b, 110c, 110d, 110e, 110f to drive six transistors 112, 114, 116, 118, 120, 122 arranged as three half-bridge circuits 112/114, 116/118, 120/122. The six transistors 112, 114, 116, 118, 120, 122 operate in saturation to provide three motor drive signals VoutA, VoutB, VoutC, 124, 126, 128, respectively, at nodes 102d, 102c, 102b, respectively. It is understood that any suitable configuration of switching elements can be used to provide the motor drive signals.

The motor control circuit 102 can also include a signal processing module 143 and signal injection module 147 the operation of which is described more fully below. The signal processing module 143 is configured to generate a position reference signal indicative of a rotational reference position of the motor 104. The modulation signal generation module 146 is coupled to receive the position reference signal and configured to change a phase of the modulation waveforms provided to the PWM generator 108.

The motor control circuit 102 can be coupled to receive a motor voltage VMOT, or simply VM, at a node 102a, which is supplied to the motor through the transistors 112, 116, 120 during times when the upper transistors 112, 116, 120 are turned on. It will be understood that there can be a small voltage drop (for example, 0.1 volts) through the transistors 112, 116, 120 when they are turned on and supplying current to the motor 104.

Figure 2:
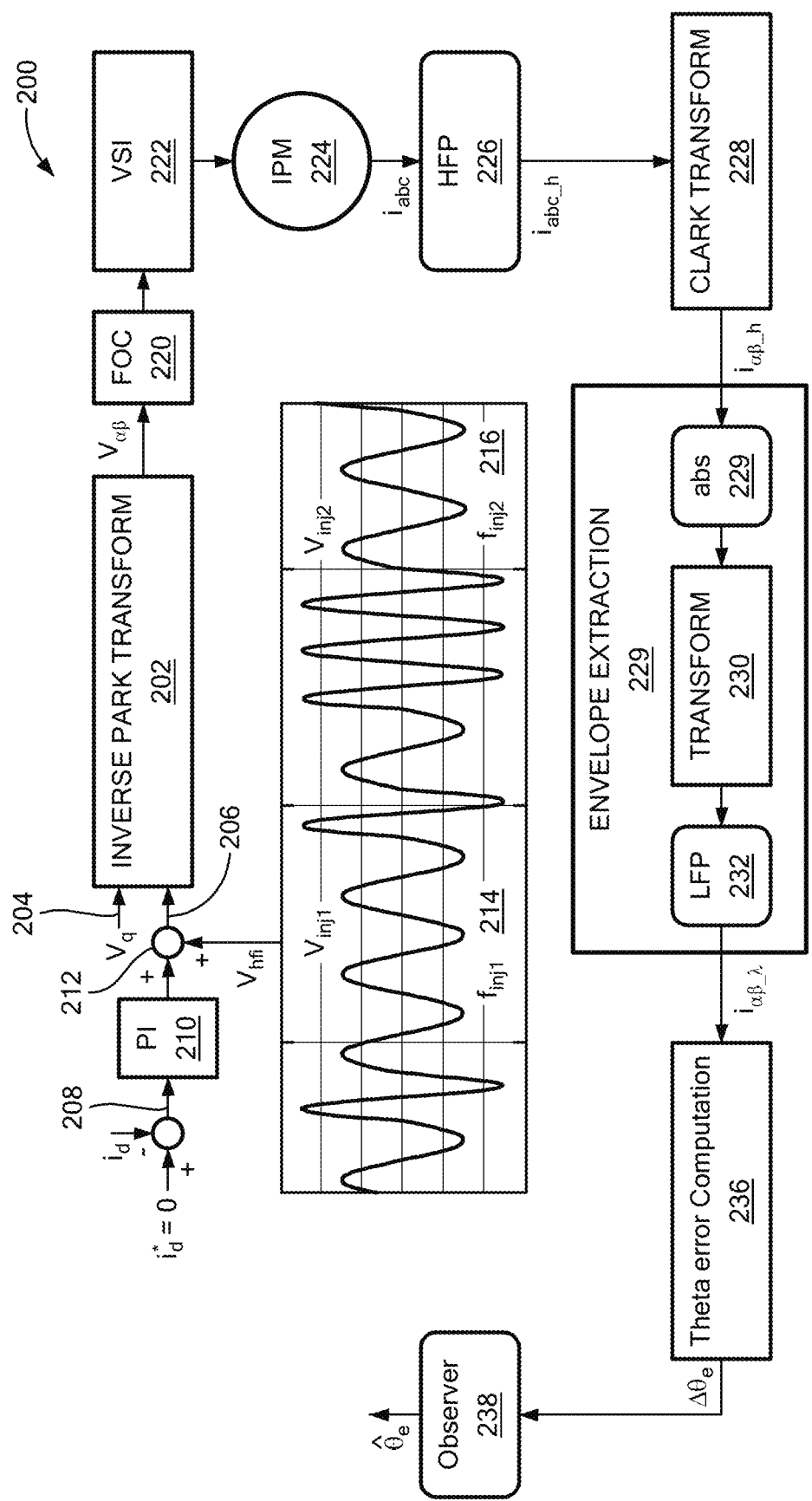
FIG. 2 is a block diagram of an example motor control system with multiple injection signals in accordance with example embodiments of the disclosure.

FIG. 2 shows an example motor controller 200 having LN-HFI motor control in accordance with example embodiments of the disclosure. The illustrated motor controller is sensorless.

A first transform module 202 receive a q input voltage signal 204 at a first input and a d input voltage signal 206 at a second input. In the illustrated embodiment, the q input voltage signal 204 comprises a direct voltage control (DVC) mode input to control Vq directly. With this arrangement, a conventional speed loop and q-axis current loop can be eliminated which improves motor control efficiency.

In in the illustrated embodiment, d-axis current error 208 is provided to a proportional integral (PI) module 210 which outputs a d-axis voltage signal to a first input of a signal combiner 212. A second input Vhfi to the signal combiner 212 comprises a selected one of a first injection signal 214 or a second injection signal 216, as described more fully below. The output of the signal combiner 212 is input to the first transform module 202, which transforms the d,q voltage inputs to a balanced two phase signals Vα, Vβ, which can be referred to as Vαβ. In the illustrated embodiment, the first transform module 202 comprises an inverse Park transform. A FOC module 220 receives the Vαβ signal for processing by a voltage switching inverter (VSI) 222 that drives the motor 224 (IPM)), as described above. The motor phase current iabc is provided to a high pass filter (HPF) 226 which outputs a high frequency component current iabc_h to a second transform module 228, a Clark transform, the output of which iαβ_h is subject to envelope extraction processing module 229. In one particular embodiment, the envelope extraction module 229 includes an absolute value calculation module, a transform module and a low pass filter. The current envelope 236 output iαβ_e can be provided to a theta error calculation module 236, from which a position error $\Delta\theta_e$ between the estimation angle and real angle can be determined. Then, a speed and theta observer 238 is used to obtain the estimation angle $\hat{\theta}_e$.

In embodiments, a position error $\Delta\theta_e$ refers to the error between estimation angle and real angle. An estimation angle $\hat{\theta}_e$ is the angle estimated from motor saliency information based on the injection scheme. The real angle refers to the electric angle of the motor.

It is understood that any practical number of injection signals can be used having any suitable variety of characteristics, e.g., frequency, amplitude, phase, etc.

It will be readily apparent to one skilled in the art that voltage levels for Vd and Vq depend on the selected motor and can vary significantly based on the motor characteristics. Injection signals can vary with the motor as well. In example embodiments, first and second voltage injection signals can be in the order of:

Vinj1=2V,freq_inj1=200 Hz

Vinj2=1V,freq_inj1=100 Hz

Figure 3:
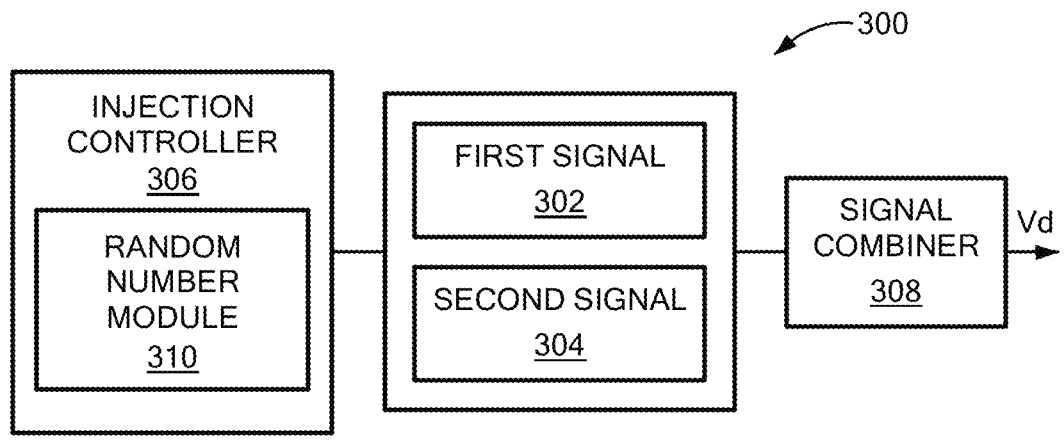
FIG. 3 is a block diagram showing further detail of an example signal injection for a motor in accordance with example embodiments of the disclosure.
Figure 3A:
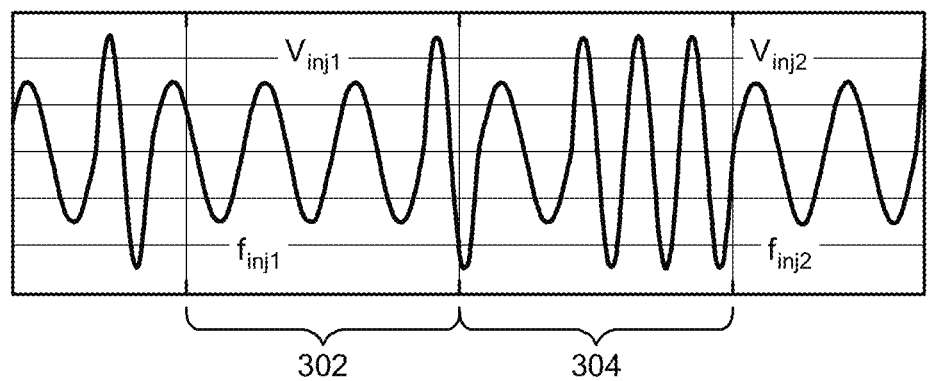
FIG. 3A shows example first and second injection signals in accordance with example embodiments of the disclosure.

FIGS. 3 and 3A shows an example implementation of a LN-HFI sensorless control system 300 is used for IPMs. First and second injection signals 302, 304 having respective voltages $V_{inj1}$, $V_{inj2}$ with different characteristics, e.g., frequency $f_{inj1}$ and $f_{inj2}$ and amplitude, injected in the d-axis randomly. In embodiments, the injection signals 302, 304 may be similar to the signals 214, 216 of FIG. 2. LN-HFI provides a high frequency signal that appears evenly in the time domain so that potential harsh and/or loud fixed frequency acoustic noise is reduced or eliminated. With this arrangement, the amount of noise generated by a motor is reduced to provide a quieter environment. The motor noise reduction will be enhanced in environments having multiple motors in a confined space.

An injection controller 306 can select the first signal 302 or the second signal 304 that can be provided to a signal combiner 308, which may be similar to the signal combiner 212 of FIG. 2. In embodiments, the injection controller 306 includes a random signal module 310. In embodiments, in order to generate the high frequency signal input to the signal combiner 308, the random signal module 310 comprises a fixed-point based random signal generator (FRSG).

In embodiments, the first signal 302 is selected for a one cycle and the second signal 304 may be selected for the next cycle depending upon whether the random signal module 310 output selects the second cycle. In some embodiments, each of the first and second signals 302, 304 have 50% duty cycles. In other embodiments, the first or second signal 302, 304 is selected more often than the other. It is understood that the signals should be continuous at the beginning of each cycle.

For example, the random signal module 310 output can be any of 0 to 8 and each will be output an equal number of times over an infinite time span. In one particular embodiment, any of 0 to 4 selects the first signal 302 and any of 5 to 8 selects the second signal 304.

It is understood that a variety of suitable selection schemes can be used for selecting the first and second injection signals to meet the needs of a particular application.

Figure 4:
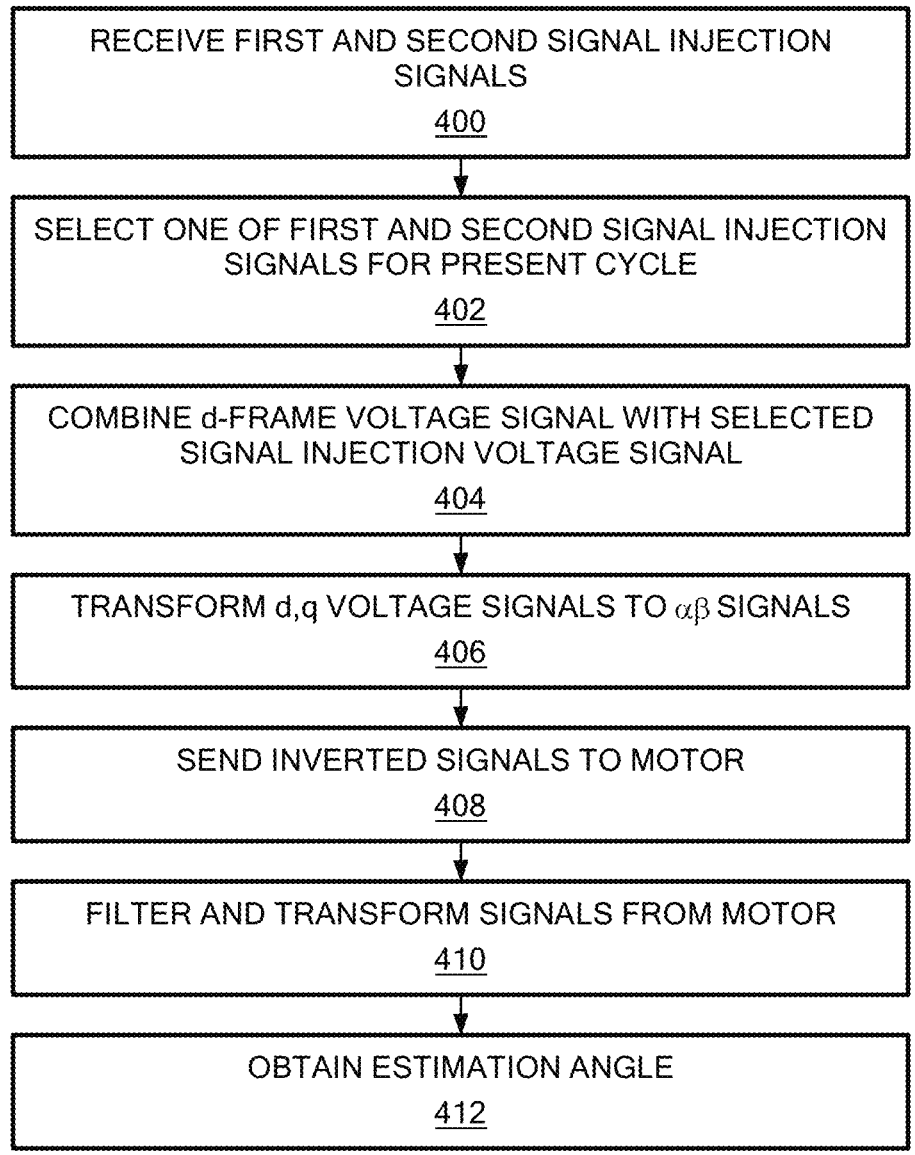
FIG. 4 is a flow diagram of an example sequence of steps for providing LN-HFI for an electric motor in accordance with example embodiments of the disclosure.

FIG. 4 shows an example sequence of steps for providing motor control having LN-HFI for an electric motor in accordance with example embodiments of the disclosure. In step 400, first and second injection signals are received. In step 402, one of the first and second injection signals for combination with a direct voltage Vd signal into transform in step 404. In embodiments, one of the first and second injection signals is selected on a cycle-by-cycle basis.

In step 406, the d,q signals are transformed into αβ signal format. In step 408, these signals are used as input of FOC algorithm which generate six switch signals processed by an inverter to drive the motor. In step 410, the current output from the motor is filtered and transformed to generate an estimate angle in step 412.

Example embodiments of the disclosure provide motor control having LN-HFI for an electric motor. Illustrative implementations can be realized in digital fix-point applications which largely reduce computation complexity as compared to conventional systems. Digital fixed-point random signal generation (FRSG) processing can be used for controlling variable-frequency-injection signals. In addition, example embodiments can include a direct voltage control (DVC) control mode that can reduce or eliminate speed/current loop(s) in conventional systems.

Example motor controller systems include U.S. Pat. Nos. 9,843,285, 10,116,243, 10,181,810, 10,312,847, 10,326, 389, 10,348,223, 10,873,280, and 10,784,810, all of which are incorporated herein by reference.

Figure 5:
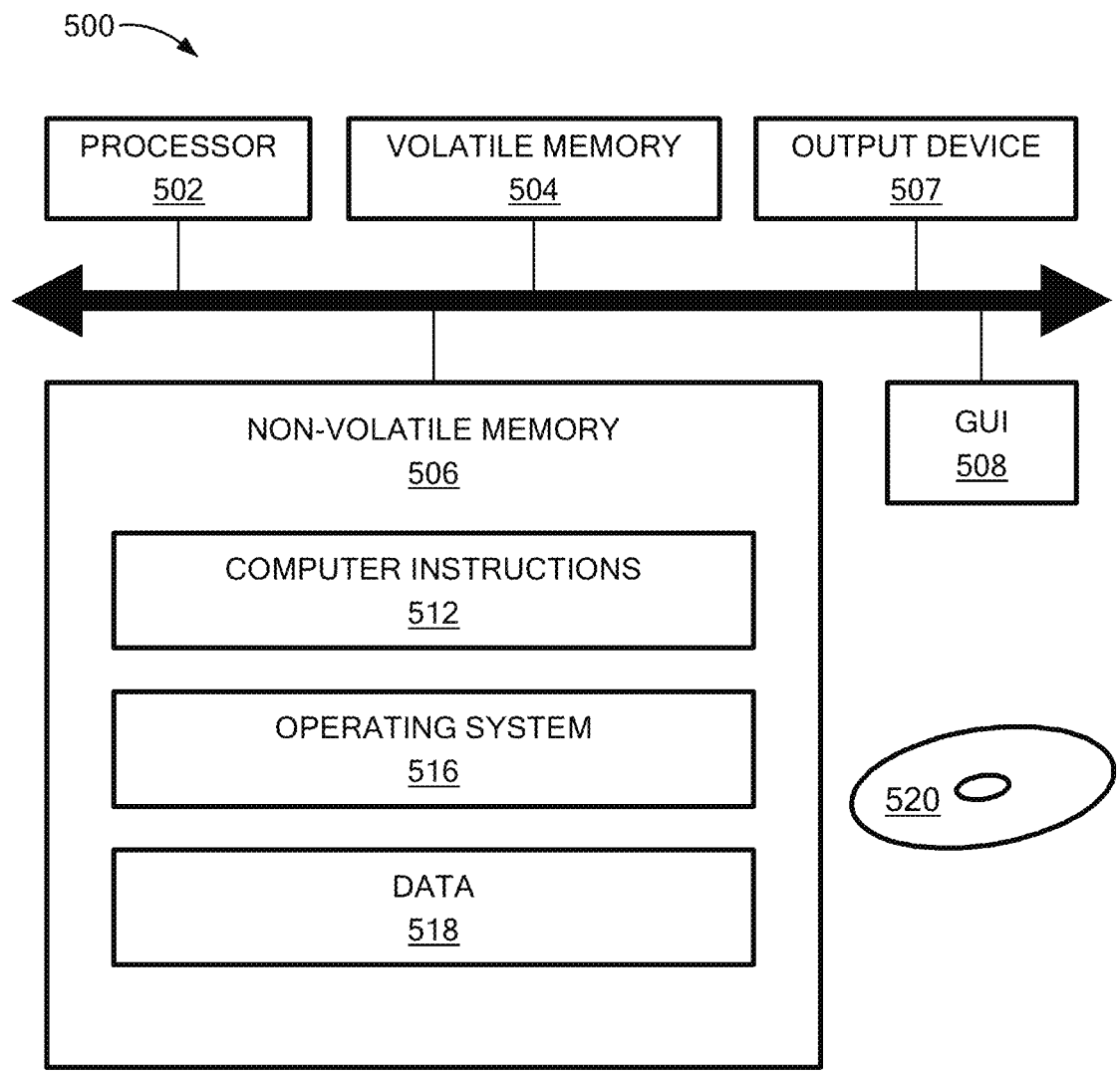
FIG. 5 is a schematic representation of an example computer that can perform at least a portion of the processing described herein.

FIG. 5 shows an exemplary computer 500 that can perform at least part of the processing described herein, such as generating BEMF compensation components. The computer 500 includes a processor 502, a volatile memory 504, a non-volatile memory 506 (e.g., hard disk), an output device 507 and a graphical user interface (GUI) 508 (e.g., a mouse, a keyboard, a display, for example). The non-volatile memory 506 stores computer instructions 512, an operating system 516 and data 518. In one example, the computer instructions 512 are executed by the processor 502 out of volatile memory 504. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
   receiving a first injection signal having first signal characteristics;
   receiving a second injection signal having second signal characteristics that are different than the first signal characteristics;
   selecting a first one of the first and second injection signals for combining with a direct voltage signal to provide an input to a first transform, wherein the first and second signal characteristics are configured to reduce acoustic noise generated by an electric motor, wherein the direct voltage signal is defined in a (d,q) coordinate system with orthogonal components along d (direct) and q (quadrature) axes such that a field flux linkage component of motor current is aligned along the d axis and a torque component of current is aligned along the q axis; and
   converting an output of the first transform to signals for driving the electric motor.

2. The method according to claim 1, further including high pass filtering a current from the motor.

3. The method according to claim 2, further including using a second transform on the current from the motor after the high pass filtering.

4. The method according to claim 3, further including extracting envelope information of high frequency current signal output from the second transform.

5. The method according to claim 4, further including determining a position error from the extracted envelope information.

6. The method according to claim 5, wherein the position error is a difference between an injection estimation angle and a real angle for the motor.

7. The method according to claim 6, further including obtaining an estimation angle for the motor.

8. The method according to claim 1, further including using a random signal generator for selecting the first one of the selecting a first one of the first and second injection signals.

9. The method according to claim 1, wherein the first signal characteristics including varying amplitude and frequency.

10. The method according to claim 9, wherein the first and second injection signals are injected randomly into the first transform.

11. The method according to claim 1, further including using direct voltage control to provide a quadrature voltage Vq to the first transform.

12. A motor controller, comprising:
    a signal generator to generate a first injection signal having first signal characteristics and a second injection signal having second signal characteristics that are different than the first signal characteristics;
    an injection controller to select a first one of the first and second injection signals for combining with a direct voltage signal to provide an input to a first transform, wherein the first and second signal characteristics are configured to reduce acoustic noise generated by an electric motor, wherein the direct voltage signal is defined in a (d,q) coordinate system with orthogonal components along d (direct) and q (quadrature) axes such that a field flux linkage component of motor current is aligned along the d axis and a torque component of current is aligned along the q axis; and
    a circuit module to converting an output of the first transform to signals for driving the electric motor.

13. The motor controller according to claim 12, further including a high pass filter to filter a current from the motor.

14. The motor controller according to claim 13, further including a second transform to transform the current from the motor after the high pass filtering.

15. The motor controller according to claim 14, an envelope extraction module to extract envelope information of high frequency current signal output from the second transform.

16. The motor controller according to claim 15, further including an angle processing module to determining a position error from the extracted envelope information.

17. The motor controller according to claim 16, wherein the position error is a difference between an injection estimation angle and a real angle for the motor.

18. The motor controller according to claim 17, further including a module to obtain an estimation angle for the motor.

19. The motor controller according to claim 12, further including a random signal generator for selecting the first one of the selecting a first one of the first and second injection signals.

20. The motor controller according to claim 12, wherein the first signal characteristics including varying amplitude and frequency.

21. The motor controller according to claim 20, wherein the first and second injection signals are configured to be injected randomly into the first transform.

22. The motor controller according to claim 12, further including an input to receive a signal for direct voltage control to provide a quadrature voltage Vq to the first transform.

23. A motor controller, comprising:
    a signal generator means for generating a first injection signal having first signal characteristics and a second injection signal having second signal characteristics that are different than the first signal characteristics;
    an injection controller means for selecting a first one of the first and second injection signals for combining with a direct voltage signal to provide an input to a first transform, wherein the first and second signal characteristics are configured to reduce acoustic noise generated by an electric motor, wherein the direct voltage signal is defined in a (d,q) coordinate system with orthogonal components along d (direct) and q (quadrature) axes such that a field flux linkage component of motor current is aligned along the d axis and a torque component of current is aligned along the q axis; and a circuit module to converting an output of the first transform to signals for driving the electric motor.

\* \* \* \* \*

UNITED STATES PATENT AND TRADEMARK OFFICE
CERTIFICATE OF CORRECTION

PATENT NO. : 12,107,528 B2
APPLICATION NO. : 18/060670
DATED : October 1, 2024
INVENTOR(S) : Lu Wang et al.

It is certified that error appears in the above-identified patent and that said Letters Patent is hereby corrected as shown below:

In the Specification

Column 4, Line 55, delete "$i\alpha\beta\_e$" and replace with --$i\alpha\beta\_\lambda$--.

In the Claims

Column 8, Line 2, delete "including" and replace with --include--.
Column 8, Line 33, delete "claim 14, an" and replace with --claim 14, further including an--.
Column 8, Line 51, delete "including" and replace with --include--.

Signed and Sealed this
First Day of April, 2025

Coke Morgan Stewart
*Acting Director of the United States Patent and Trademark Office*